(12) United States Patent
Gage

(10) Patent No.: US 9,025,531 B2
(45) Date of Patent: May 5, 2015

(54) MOBILE DEVICE DRIVEN INFORMATION EXCHANGE

(75) Inventor: William Gage, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/813,287

(22) PCT Filed: Mar. 4, 2011

(86) PCT No.: PCT/CA2011/050130
§ 371 (c)(1),
(2), (4) Date: Jan. 30, 2013

(87) PCT Pub. No.: WO2012/119217
PCT Pub. Date: Sep. 13, 2012

(65) Prior Publication Data
US 2013/0336209 A1    Dec. 19, 2013

(51) Int. Cl.
| | |
|---|---|
| *H04Q 7/00* | (2006.01) |
| *H04W 8/26* | (2009.01) |
| *H04L 12/54* | (2013.01) |
| *H04L 29/08* | (2006.01) |
| *H04L 29/06* | (2006.01) |
| *H04W 28/08* | (2009.01) |
| *H04W 76/02* | (2009.01) |
| *H04W 88/06* | (2009.01) |
| *H04L 29/12* | (2006.01) |

(52) U.S. Cl.
CPC ............ *H04W 8/26* (2013.01); *H04L 12/5691* (2013.01); *H04W 28/08* (2013.01); *H04W 76/02* (2013.01); *H04W 88/06* (2013.01); *H04L 67/141* (2013.01); *H04L 69/18* (2013.01); *H04L 61/6077* (2013.01); *H04L 61/2007* (2013.01)

(58) Field of Classification Search
None
See application file for complete search history.

(56) References Cited

U.S. PATENT DOCUMENTS

| | | | |
|---|---|---|---|
| 8,737,354 B2 * | 5/2014 | Faucher et al. | ............... 370/331 |
| 2007/0230468 A1 | 10/2007 | Narayanan et al. | |
| 2008/0304434 A1 | 12/2008 | Giaretta et al. | |

(Continued)

FOREIGN PATENT DOCUMENTS

| | | |
|---|---|---|
| EP | 1986372 A1 | 10/2008 |
| GB | 2446877 A | 8/2008 |
| WO | 2010024961 A1 | 3/2010 |

OTHER PUBLICATIONS

International Search Report and Written Opinion for corresponding International Application No. PCT/CA2011/050130, dated Sep. 13, 2012, 8 pages.

(Continued)

*Primary Examiner* — Duc C Ho
(74) *Attorney, Agent, or Firm* — Conley Rose, P.C.; J. Robert Brown, Jr.

(57) ABSTRACT

A system and method are disclosed for exchanging data in a heterogeneous wireless communications environment. A mobile device initiates a first communication session with a first radio access network (RAN) that is connected to a wired network comprising a remote fixed node (RFN). A first set of data exchange transactions with the RFN is initiated by the mobile device during the first communication session to exchange a first set of data. The mobile device then initiates a second communication session with a second RAN that is likewise connected to the wired network. A second set of data exchange transactions with the RFN is initiated by the mobile device during the second communication session to exchange a second set of data contemporaneously with the first set of data exchange transactions.

14 Claims, 8 Drawing Sheets

(56) References Cited

U.S. PATENT DOCUMENTS

| | | | |
|---|---|---|---|
| 2009/0122990 A1 | 5/2009 | Gundavelli et al. | |
| 2010/0091733 A1* | 4/2010 | Hahn et al. | 370/331 |
| 2011/0122812 A1* | 5/2011 | Jeong et al. | 370/328 |
| 2012/0127974 A1* | 5/2012 | Doppler et al. | 370/338 |
| 2012/0276904 A1* | 11/2012 | Bachmann et al. | 455/436 |

OTHER PUBLICATIONS

European Extended Search Report; Application No. 11860122.8; Jan. 7, 2015; 8 pages.

Dreibholz, Thomas, et al.; "On the Use of Concurrent Multipath Transfer Over Asymmetric Paths"; IEEE Globecom; 2010; 6 pages.

* cited by examiner

MOBILE DEVICE DRIVEN INFORMATION EXCHANGE

PRIORITY

This is a U.S. national stage of application No.: PCT/CA2011/050130, filed on Mar. 4, 2011. All the benefits accruing therefrom under 35 U.S.C §119, the contents of which in its entirety are herein incorporated by reference.

BACKGROUND

In a wireless telecommunications system, mobile devices such as wireless user equipment traverse a wireless coverage area while communicating with other hosts that are either inside the wireless domain or outside in a wired domain. Any host, wired or wireless, that uses the Internet Protocol (IP) for communication is assigned an IP address that can be used to uniquely distinguish that host from all others. In a wired network environment, the IP address assigned to a host has topological significance, meaning that the address can be used to locate the point where the host is physically attached to the network. Routers, which are responsible for forwarding packets to a host, use the address to find a routing table entry that defines the next hop along the path to the attachment point associated with the address used by that host. Since information in routing tables is quasi-static, routers assume that an attachment point and its corresponding host are immobile. Therefore, only a change in network topology (e.g., a change caused by link failures) will cause a change in the routing information.

In contrast, the IP address assigned to a mobile device operating in a wireless telecommunications system will likely not be related to the point were the device is attached to the network. This is especially true when a mobile device communicates with different access points (e.g., base stations) as it travels through a wireless domain. More particularly, it is not uncommon in today's heterogeneous wireless environment for a multi-homed mobile device to have simultaneous connections to multiple access networks, each of which may use a different radio access technology. When this is the case, a unique IP address is assigned to the mobile device by each access network. However, no generic mechanism currently exists within current Internet protocols to correlate those individual IP addresses to the same mobile device. Instead, each assigned address represents a different end-point from the routing perspective of the Internet at-large.

This lack of correlation becomes problematic during an intersystem or inter-technology handover when a mobile device attempts to move packet flows from one radio access network to another. Such packet flows are used when the information requested by the mobile device is too large to fit into a single datagram. When this is the case, the requested information is segmented across multiple datagrams either by the source of the information (e.g. a web or cache server) or by an intermediate transit point (e.g. a wireless gateway). As a result, datagrams in the packet flow may arrive at the mobile device in any order or may even be lost in transit, especially if the mobile device changes its point(s) of attachment to the network.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
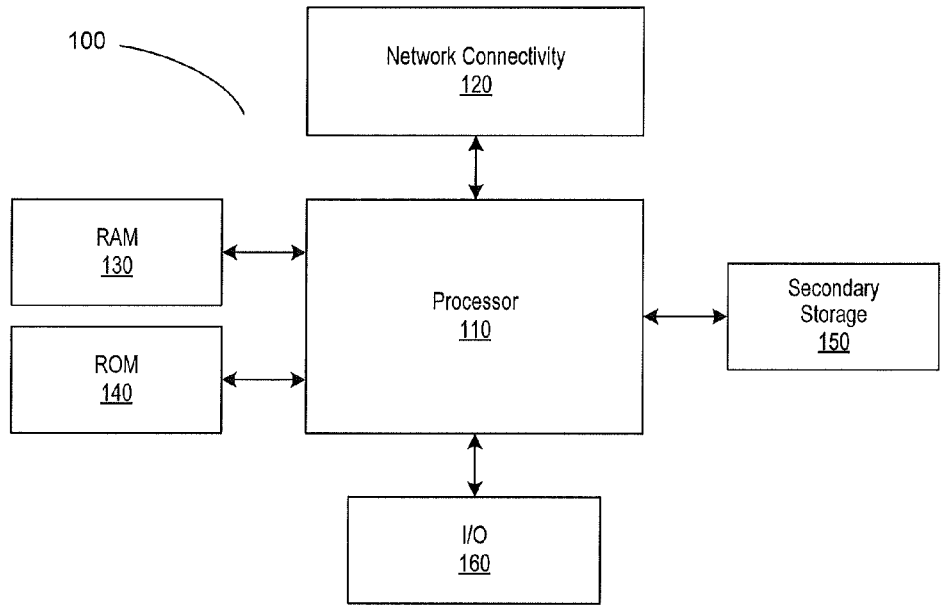
FIG. 1 depicts an exemplary system in which the present disclosure may be implemented.

The present disclosure is directed in general to communications systems and methods for operating same. In one aspect, the present disclosure relates to the methods, systems and devices for mobile device-driven exchange of information in a heterogeneous wireless communications environment.

A system and method are provided for mobile device-driven exchange of information in a heterogeneous wireless communications environment. In various embodiments, a wired network comprises a plurality of remote fixed nodes (RFN) each of which is operable to exchange a set of data. In these and other embodiments, the wired network is connected to a plurality of radio access networks (RAN) each of which comprises a radio access technology (RAT).

In these and other embodiments, the mobile device comprises a plurality of network connectivity interfaces each of which is operable to use one of the RATs to initiate a communication session with one of the RANs. In this embodiment, the RAN assigns an IP address to the associated mobile device network connectivity interface and the mobile device uses this IP address to initiate a set of data exchange transactions in order to exchange a set of data with one or more of the RFNs via the associated interface and RAN.

In one embodiment, a mobile device comprises a first network connectivity interface operable to use a first RAT to initiate a communication session with a first RAN. In this embodiment, the mobile device uses a first IP address assigned by the first RAN to the first network connectivity interface to initiate a first set of data exchange transactions. In another embodiment, the mobile device comprises a second network connectivity interface operable to use a second RAT to initiate a communication session with a second RAN. In this embodiment, the mobile device uses a second IP address assigned by the second RAN to the second network connectivity interface to initiate a second set of data exchange transactions.

In various embodiments, a set of data comprises a set of data chunks each of which is designed to be transported inside an Internet Protocol (IP) datagram. In one embodiment, a first RFN comprises a first set of data. In this embodiment, a first data chunk from the first set of data is exchanged between the mobile device and the first RFN in a first data exchange transaction over the first interface using the first IP address and a second data chunk from the first set of data is exchanged between the mobile device and the first RFN in a second data exchange transaction over the first interface using the first IP address.

In another embodiment, a first data chunk from the first set of data is exchanged between the mobile device and the first RFN in a first data exchange transaction over the first interface using the first IP address and a second data chunk from the first set of data is exchanged between the mobile device and the first RFN in a second data exchange transaction over the second interface using the second IP address.

In another embodiment, a second RFN also comprises the first set of data. In this embodiment, a first data chunk from the first set of data is exchanged between the mobile device and the first RFN in a first data exchange transaction over the first interface using the first IP address and a second data chunk from the first set of data is exchanged between the mobile device and the second RFN in a second data exchange transaction over the second interface using the second IP address.

In another embodiment, a third RFN comprises a second set of data. In this embodiment, a first data chunk from the first set of data is exchanged between the mobile device and the first RFN in a first data exchange transaction over the first interface using the first IP address and a second data chunk from the second set of data is exchanged between the mobile device and the third RFN in a second data exchange transaction over the second interface using the second IP address.

In various embodiments, a data exchange transaction comprises a data retrieval request and a data retrieval response. In various other embodiments, a data exchange transaction comprises a data submission request and a data submission response. In these and other embodiments, a first data chunk and a second data chunk of a set of data may not be received by the mobile device or the RFN in sequential order. If so, the mobile device or RFN respectively process the first data chunk and the second data chunk in sequential order to generate the set of data.

In these and other embodiments, a data request or a data response of a first data exchange transaction may not be received by the mobile device or the RFN; as a consequence, the associated data chunk is not received by the mobile device or the RFN. In this embodiment, the mobile device may initiate a second data exchange transaction in order to complete the exchange of the missing data chunk and to generate the set of data. In some embodiments, the first data exchange transaction may be conducted over a first interface using a first IP address and the second data exchange transaction may also be conducted over the first interface using the first IP address. In other embodiments, the first data exchange transaction may be conducted over a first interface using a first IP address and the second data exchange transaction may be conducted over a second interface using a second IP address. In these and other embodiments, data exchange requests may be initiated in any order. In these and other embodiments, data exchange responses may be returned in any order. In these and other embodiments, the data exchange transactions may be contemporaneous.

From the foregoing, skilled practitioners of the art will appreciate that the present disclosure offers various advantages over Transmission Control Protocol (TCP) when it is implemented in a wireless communications environment. More specifically, unlike TCP, where information is streamed from sender to receiver as an ordered monotonically-increasing sequence of bytes over a single connection, the disclosure described in greater detail herein allows information to be requested or submitted by the mobile device in any order and over any radio link available to the mobile device. Likewise, no explicit acknowledgement is required from the mobile device that it has successfully received information, unlike TCP, which requires an explicit acknowledgement from the receiver that data has been successfully received so that the next sequence of bytes can be transmitted. Instead, the mobile device requests information that it does not have and sends information as it becomes available. This sometimes means that a request must be re-issued if information that was previously requested or submitted was not properly received.

Likewise, transactions in the mobile device-driven system and method described in greater detail herein can be repeated with no side effects. That is, no assumptions are made as to the reasons for receiving a duplicate request or a duplicate late response, unlike TCP where duplicated ACKs and data are interpreted as indications of packet loss, which leads to possibly erroneous invocation of congestion controls. Also unlike TCP or FTP where the server (i.e. an RFN) must maintain state context to determine what information has been and should be transmitted, the server simply responds to requests from the mobile device. Once it has been processed, the request is then discarded and forgotten by the server, which can significantly reduce the load on a server and simplify load balancing and distribution across a cluster of servers. Likewise, information is exchanged through a simple request-response transaction that is completely self-contained, unlike TCP, which requires an initial handshake to establish a connection, a final handshake to cleanly terminate a session, and an exchange of status information during the lifetime of the connection.

Another advantage over TCP, which is based on the transport of a byte stream, information is exchanged as units (information objects) defined by the application, allowing information to be partitioned or framed in a way that best suites the application. The information object is then segmented into chunks that can fit inside a single IP packet or other datagram. Likewise, a remote sender attempts to deduce the reason for a lost packet when using TCP and often guesses wrong when a wireless link is involved. As described in greater detail herein, the mobile device makes no assumptions about why information has not been received. The request itself or its corresponding response may have been lost in transit due to transmission errors or congestion, the destination node for the request may have failed or become disconnected from the network, the route may have changed due to link failure or due to device mobility while datagrams are in-flight, etc. Regardless of the reason, the recovery mechanism is the same in all cases—initiate a new transaction to exchange the lost information.

Also unlike TCP, which operates independently of the link layer, the mobile device is able to determine if datagrams have been lost due to transmission errors or loss of connectivity on the radio link. This allows the mobile device to respond intelligently to this loss of information and avoid the TCP problem whereby the sender always assumes datagram loss is due to congestion, which typically leads to throughput degradation when the sender misinterprets radio link errors and initiates congestion avoidance procedures. Likewise, the mobile device decides on which information is to be received from, or sent to, which remote node and over which radio link.

This approach allows the mobile device to select, according to the requirements of its applications, the best path to use to exchange information that is of greatest importance at a particular point in time, unlike TCP, which operates independently of the application.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As used herein, the term "mobile device" can refer to wireless devices such as mobile telephones, smart phones, personal digital assistants (PDAs), handheld or laptop computers, and similar devices or other user equipment that has telecommunications capabilities. The term "mobile device" may also refer to devices that have similar capabilities but that are not generally transportable, such as desktop computers, set-top boxes, or network nodes that are equipped with two or more network connectivity interfaces.

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known interfaces for connecting to networks. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

Figure 2:
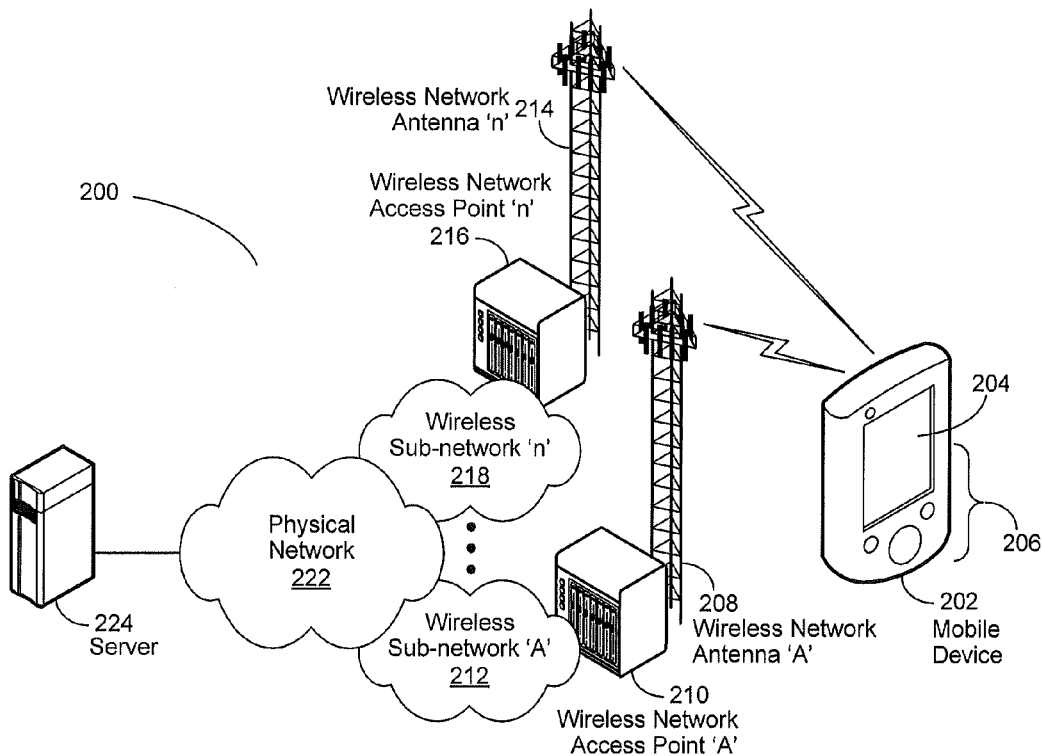
FIG. 2 shows a wireless communications system including an embodiment of a mobile device.

FIG. 2 shows a wireless communications system including an embodiment of a mobile device. Though illustrated as a mobile phone, the mobile device 202 may take various forms including a wireless handset, a pager, and a personal digital assistant (PDA). In various embodiments, the mobile device 202 may also comprise a portable computer, a tablet computer, a laptop computer, or any computing device operable to perform data communication operations. Many suitable devices combine some or all of these functions. In some embodiments, the mobile device 202 is not a general purpose computing device like a portable, laptop, or tablet computer, but rather is a special-purpose communications device such as a telecommunications device installed in a vehicle. The mobile device 202 may likewise be a device, include a device, or be included in a device that has similar capabilities but that is not transportable, such as a desktop computer, a set-top box, or a network node. In these and other embodiments, the mobile device 202 may support specialized activities such as gaming, inventory control, job control, task management functions, and so on.

In various embodiments, the wireless network antennas 'A' 208 through 'n' 214 (e.g., a cell tower) are respectively used by the mobile device to establish a wireless communications session with wireless network access points 'A' 210 through 'n' 216. In turn, the wireless network access points 'A' 210 through 'n' 216 are respectively coupled to wireless sub-networks 'A' 212 through 'n' 218. In various embodiments, the wireless sub-networks 'A' 212 through 'n' 218 are coupled through a wireless to a physical network 222, such as the Internet.

Via the wireless sub-networks 'A' 212 through 'n' 218, and the physical network 222, the mobile device 202 has access to information on other mobile devices 202 and on various servers, such as the server 224. Alternatively, the mobile device 202 may access the wireless sub-networks 'A' 212 through 'n' 218 through a peer mobile device 202 acting as an intermediary in a relay type or hop type of connection. Skilled practitioners of the art will recognized that many such embodiments are possible and the foregoing is not intended to limit the spirit, scope, or intention of the disclosure.

Figure 3:
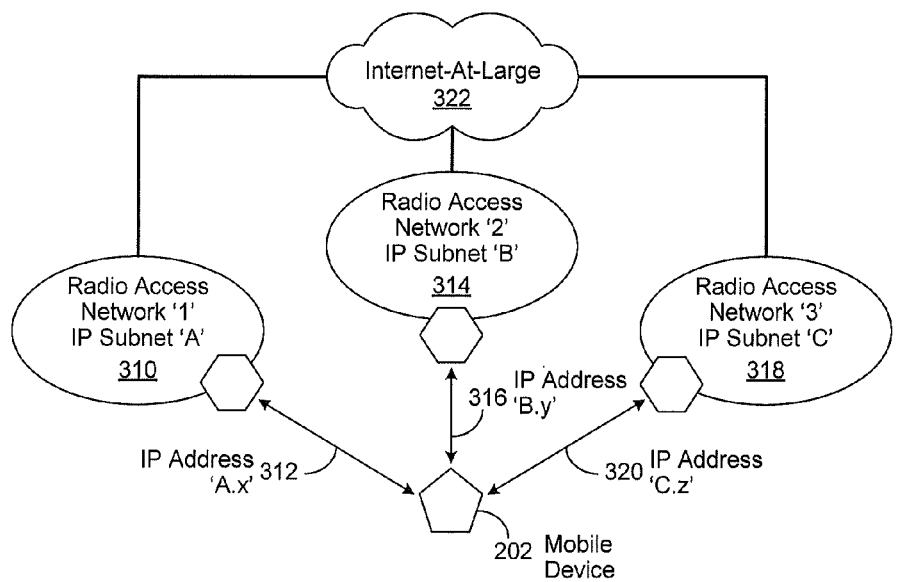
FIG. 3 is a simplified block diagram of a multi-homed mobile device operating in a heterogeneous radio access technology (RAT) environment.

FIG. 3 is a simplified block diagram of a multi-homed mobile device as implemented in accordance with an embodiment of the disclosure for operating in a heterogeneous radio access technology (RAT) environment. In this embodiment, the Internet-at-large 322 is physically connected to Radio Access Network (RAN) '1' 310, comprising Internet Protocol (IP) subnet 'A,' RAN '2' 314, comprising IP subnet 'B', and RAN '3' 318, comprising IP subnet 'C.' As mobile device 202 traverses the wireless coverage area respectively provided by RAN '1' 310, '2' 314, and '3' 318, it is respectively assigned a unique IP address 'A.x' 312, 'B.y' 316, 'C.z' 320 by RAN '1' 310, '2' 314, '3' 318 that corresponds to their associated IP subnets 'A', 'B', and 'C'. The unique IP addresses 'A.x' 312, 'B.y' 316, 'C.z' 320 assigned to the mobile device 202 are then used to establish communication with other hosts that reside inside RAN '1' 310, '2' 314, '3' 318 or the Internet-at-large 322.

Figure 4:
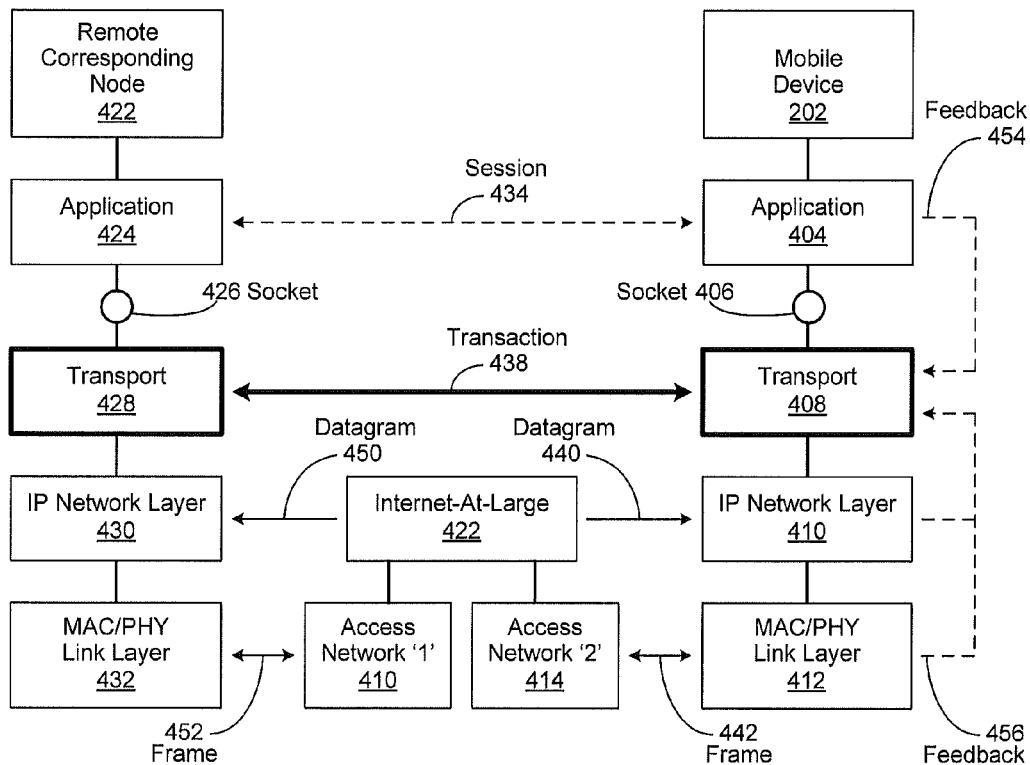
FIG. 4 is a simplified block diagram of a transaction-based protocol stack.

FIG. 4 is a simplified block diagram of a transaction-based protocol stack as implemented in accordance with an embodiment of the disclosure. In this and other embodiments, a transaction-based protocol stack is respectively implemented on a remote corresponding node (RCN) 422 and a mobile device 202, which respectively comprise an application 424, 404 operable to exchange data in a session 434. As shown in FIG. 4, the transaction-based protocol stack implemented on RCN 422 comprises a socket 426 to provide an interface to the application 424, a transport layer 428, a Internet Protocol (IP) network layer 430, and a MAC/PHY link layer 432. Likewise, the transaction-based protocol stack implemented on the mobile device 202 comprises a socket 406 to provide an interface to the application 404, a transport layer 408, an Internet Protocol (IP) network layer 410, and a MAC/PHY link layer 412.

As likewise shown in FIG. 4, the MAC/PHY link layer 432 is used by the RCN 422 to establish communication with access network '1' 310 with one or more data communication frames 452. Likewise, the MAC/PHY link layer 402 is used by the mobile device 202 to establish communication with access network '2' 314 with one or more data communication frames 442. In turn, the access networks '1' 310 and '2' 314 are connected to the Internet-at-large 322, which respectively uses one or more datagrams 450, 440 to communicate with the IP network layers 430, 410.

In this and other embodiments, the transaction-based protocol stack is implemented to use scatter-gather techniques for information exchanges that are initiated by the mobile device 202. In particular, the transport layer 428, 408 of the transaction-based protocol stack shown in FIG. 4 uses a transaction 438 as its basic building block for the exchange of data. As such, the transactions 436 are designed to work directly over the datagram service 450, 440 provided by the underlying IP network layer 428, 408. However, in various embodiments, the transaction-based protocol stack may not be layered, but instead may comprise an integrated or cross-layer model.

In various embodiments, feedback 456 on the state of the radio link connecting the mobile device 202 to the access network '2' 314 is used by the transport layer 408 to adapt its operation to constantly-changing local radio communication conditions. Likewise, feedback 456 from the IP network layer 410 is used by the transport layer 408 to avoid congestion and maintain balance when competing for bandwidth with other packet flows. Knowledge of the applications running on the mobile device 202 is used by the transport layer to adapt its operations to application-specific requirements. In these and other embodiments, session semantics for session 434, if required, are maintained by applications 424 and 404. Likewise, the relationship between the chunks of information conveyed by the transaction(s) 438 of the transport layer 428, 408 and the information objects that are meaningful to the applications 424, 404 are handled by the applications 424, 404 themselves or by middleware (e.g., sockets 426, 406) mediating between the two layers.

Figure 5:
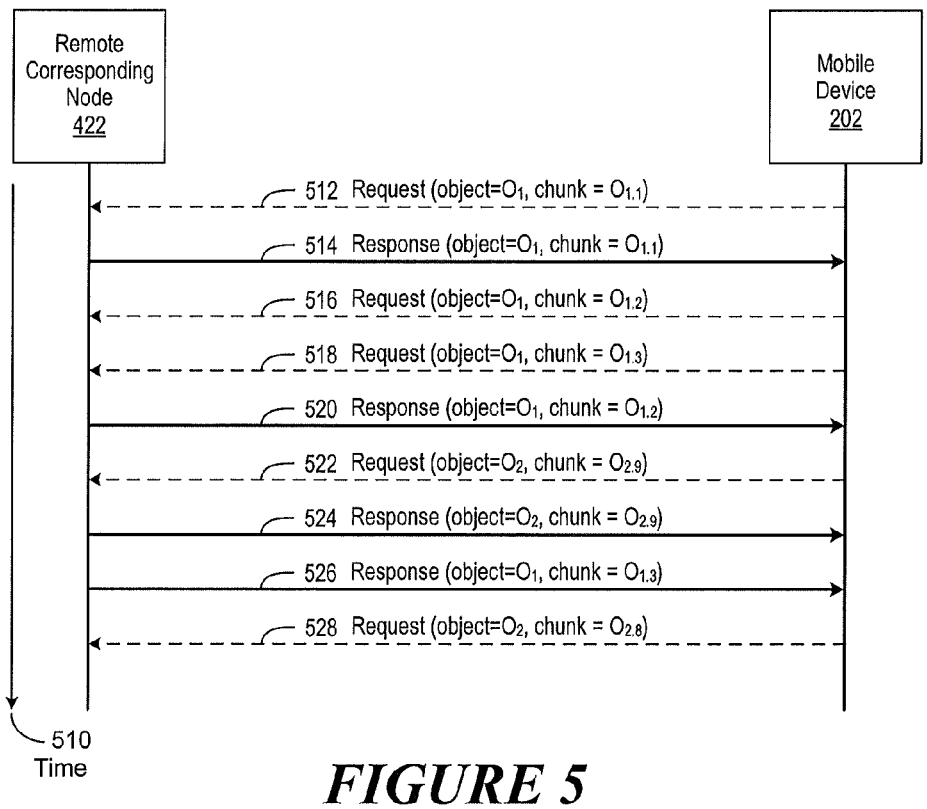
FIG. 5 shows a process signal flow for request/response transmissions.

FIG. 5 shows an exemplary process signal flow for request/response transmissions as implemented in accordance with an embodiment of the disclosure. In this embodiment, information is exchanged within a request/response transaction that is initiated by a mobile device 202. In this and other embodiments, each request/response transaction is self-contained and idempotent and comprises a plurality of requests and responses conducted over a period of time 510. There is no concept of a "session" or a "connection" therefore there are no set-up or tear-down handshakes.

As shown in FIG. 5, transaction requests 512, 516, 518, 522, 528 are sent from the mobile device 202 to a Remote Corresponding Node (RCN) 422 to indicate the chunks of information that the mobile device 202 is attempting to exchange with the RCN 422. The RCN 422 replies with transaction responses 514, 520, 524, 526 that contain the results of the transaction requests 512, 516, 518, 522, 528, thus completing the transaction. In this and other embodiments, the mobile device 202 may initiate a new transaction request before it receives a response to a previous request, thus allowing transactions to be overlapped. Likewise, the RCN 422 may respond to overlapping requests in any order, thus allowing the RCN 422 to independently optimize its own internal processing.

In these various embodiments, the individual requests 512, 516, 518, 522, 528 and the individual responses 514, 520, 524, 526 are fitted into a single datagram to ensure that packet fragmentation is not required by intermediate routers and to minimize the amount of buffer state information that is maintained. In various embodiments, multiple transaction requests (e.g., transaction requests 516, 518) are packed into a single datagram (e.g., an IP packet) to minimize overhead. However each corresponding transaction response (e.g., transaction responses 520, 526) is transported in its own datagram.

In this and other embodiments, both the transaction requests 512, 516, 518, 522, 528 and transaction responses 514, 520, 524, 526 include an information identifier to designate the chunk of information being exchanged. The identifier contains a reference to the overall information container (the "Information Object Identifier") and to the position of the information chunk within the container (the "Information Chunk Identifier"). The Information Object Identifier is a label that is agreed to by both the information provider and the information consumer applications to uniquely identify the information being exchanged. Exemplary Information Object Identifiers may include:

- a static global label such as a DOI (e.g., doi:10.1000/182);
- a location-specific label such as a Uniform Resource Locator (URL) (e.g., rfc-editor.org/rfc/rfc791.txt);
- a content identifier, such as a SHA-1 hash (e.g., urn:sha1: 3I42H3S6NNFQ2MSVX7XZKYAYSCX5QBYJ);
- a dynamic label, such as the fields of an IP multicast packet header In various embodiments, the Information Chunk Identifier may be an absolute chunk identifier, a relative chunk identifier, or a chunk map. An exemplary absolute chunk identifier is expressed as the tuple (byteNumber, numberOfBytes) where <byteNumber> indicates where the first byte in this chunk appears within the overall information object and <numberOfBytes> identifies the number of bytes contained in this chunk. A chunk map identifies a sequential set of fixed-length chunks within the information object. An exemplary map is expressed as a tuple (chunkNumber, chunkSize, bitmap) where <chunkNumber> is the first chunk within the map, <chunksize> is the number of bytes assumed for each fixed-length chunk, and <bitmap> contains a '1' for every chunk in the sequence being requested.

In this and other embodiments, the Information Object Identifier may be qualified to allow the mobile device 202 to retrieve or submit metadata associated with the information object rather than the actual information housed within the information object container. As used herein, examples of metadata include, but are not limited to:

- content size, indicating the size, in number of bytes, of the content referenced by the object identifier.
- content type, describing the nature of the identified content, for example, by a Multipurpose Internet Mail Extensions (MIME) type.
- content encoding, describing how the content is encoded within the information object container (e.g., unicode text, binary, encrypted, compressed).
- content language, indicating the language used in the content.
- modification timestamp, indicating the date and time at which the content was last modified.
- authentication signature, containing an uncertified integrity check value to verify that the contents have not been corrupted or modified by an unauthorized entity.
- authority, containing a pointer to an entity where the receiver of information can obtain a certified authentication signature.
- key reference, containing a pointer to a key distribution facility indicating where and how the receiver of information can obtain the key for decrypting or authenticating secured information.

Figure 6:
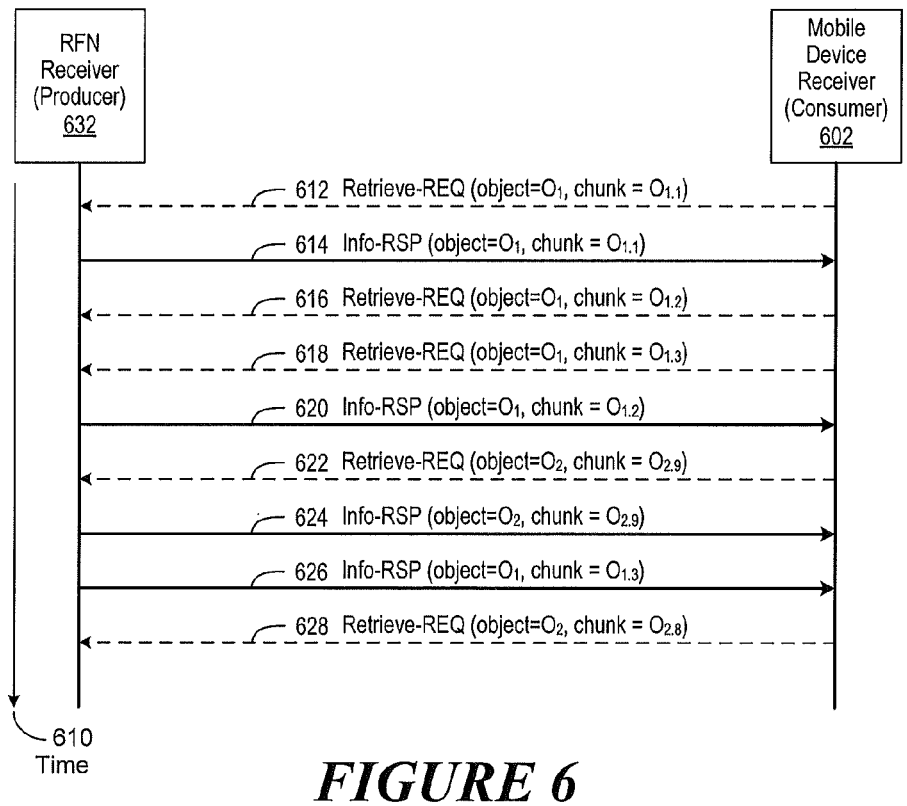
FIG. 6 shows a process signal flow for receiver-driven information retrieval.

In an exemplary manner, metadata may be requested through an extension of the standard Uniform Resource Indicator (URI) scheme:

scheme://authority/path::metalabel
where <metalabel> identifies the metadata being requested. For example:
doi:10.1000/182::authority
//rfc-editor.org/rfc/rfc791.txt::size FIG. 6 shows an exemplary process signal flow as implemented in accordance with an embodiment of the disclosure for receiver-driven information retrieval. In this embodiment, information is exchanged between a mobile device 202 and a Remote Fixed Node (RFN) 632 within a request/response transaction that is initiated by the mobile device 602. In this and other embodiments, each request/response transaction is self-contained and idempotent and comprises a plurality of requests and responses conducted over a period of time 610. There is no concept of a "session" or a "connection," therefore there are no set-up or tear-down handshakes.

As shown in FIG. 6, a mobile device 602 is a consumer of information (the "information receiver") and the RFN 632 is a provider of information (the "information sender"). As used herein, an RFN 632 refers to a network element, such as a server, that is connected to the wired Internet or other physical network, whose IP address is quasi-static. As likewise shown in FIG. 6, the mobile device 602 sends information retrieval requests 612, 616, 618, 622, 628 to the RFN 632 to indicate the chunk(s) of information the mobile device 602 is attempting to retrieve. The RFN 632 replies with information retrieval responses 614, 620, 624, 626, which contain the results of the transaction requests 612, 616, 618, 622, 628, thus completing the transaction. If the information receiver (mobile device 602) requires additional chunks of information, then it initiates additional transactions. If the requested information chunk is not received (e.g., due to transmission errors, network congestions, overload conditions on a server, equipment failure, etc.) by the RFN 632, the mobile device 602 likewise initiates a new transaction for the missing information.

Figure 7:
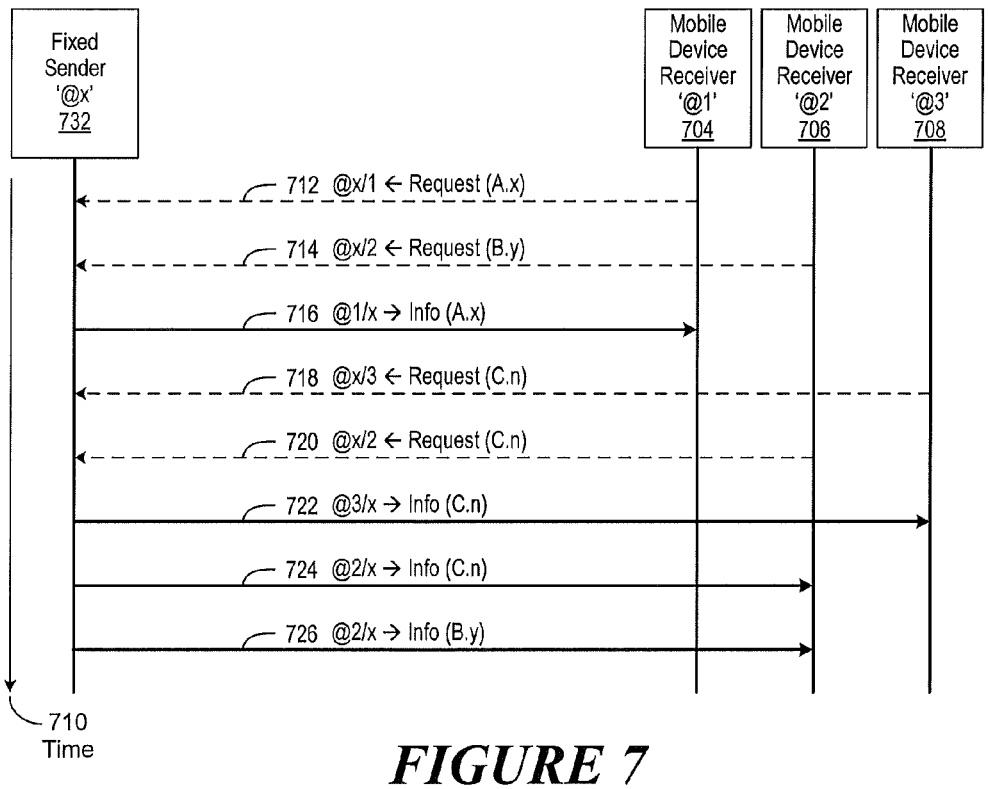
FIG. 7 shows a process signal flow for information retrieval transaction processing at an information sender.

FIG. 7 shows an exemplary process signal flow as implemented in accordance with an embodiment of the disclosure for information retrieval transaction processing at an information sender. In this embodiment, information is exchanged between a plurality of mobile devices 702, 704, and 706 and a fixed information sender '@x' 732 within request/response transactions that are initiated by the plurality of mobile devices 702, 704, and 706. In this and other embodiments, each request/response transaction is self-contained and idempotent and comprises a plurality of requests and responses conducted over a period of time 710. There is no concept of a "session" or a "connection," therefore there are no set-up or tear-down handshakes.

As shown in FIG. 7, the plurality of mobile devices '@1' 702, '@2' 704, and '@3' 706 are consumers of information (the "information receivers") and the fixed information sender '@x' 732, such as a Remote Fixed Node (RFN), is a provider of information (the "information sender"). As likewise shown in FIG. 7, the mobile device '@1' 702 sends an information retrieval request 712 to the fixed information sender '@x' 732, which in turn responds with an information response 716, which contains the requested information. Likewise, the mobile device '@2' 704 respectively sends information retrieval requests 714 and 720 to the fixed information sender '@x' 732, which in turn responds with information responses 726 and 720, which respectively contain the requested information. The mobile device '@3' 708 likewise sends an information retrieval request 718 to the fixed information sender '@x' 732, which in turn responds with an information response 722, which contains the requested information.

From the perspective of a Remote Fixed Node (RFN) acting as the fixed information sender '@x' 732, there is no correlation between the transactions. This allows the fixed information sender '@x' 732 to handle all transactions in a uniform manner, regardless of whether multiple requests originate from the same information receiver, or whether requests from different information receivers are interleaved. More importantly, it eliminates the need for maintaining state and context information at the fixed information sender '@x' 732.

Likewise, the fixed information sender '@x' 732 is free to make local decisions to optimize its operation. For example, the fixed information sender '@x' 732 is not required to respond to the information retrieval requests 712, 714, 718, 720 in the same order they were received. This allows the fixed information sender '@x' 732 to independently prioritize its handling of information retrieval requests according to local conditions.

As shown in FIG. 7, the mobile device '@2' 704 issues two overlapping retrieval requests to the fixed information sender '@x' 732, one information retrieval request 714 for information chunk 'B.y' and another information retrieval request 718 for information chunk 'C.n.' The mobile device '@3' 706 likewise makes a concurrent information retrieval request for information chunk 'C.n.' In response, the fixed information sender '@x' 732 performs a local optimization by sending information retrieval responses 722, 724, which contain information chunk 'C.n,' to both mobile device '@3' 706 and mobile device '@2' 704 before sending information retrieval response 726, which contains information chunk 'B.y,' to the mobile device '@2' 706.

Figure 8:
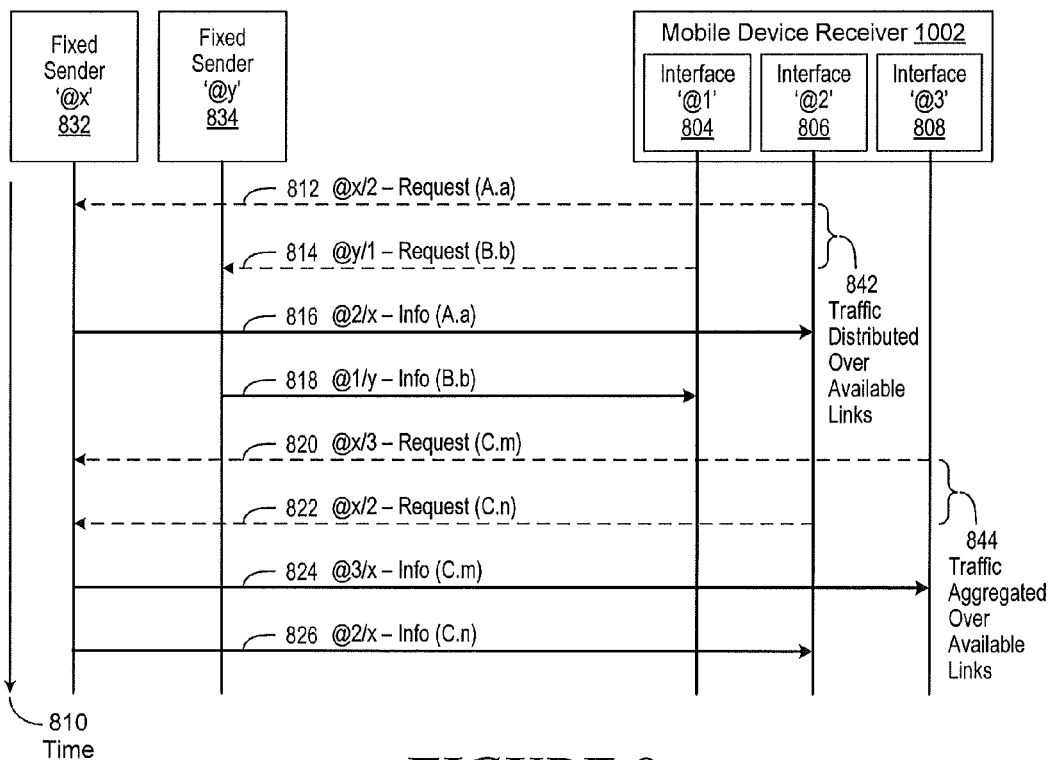
FIG. 8 shows a process signal flow for information retrieval transaction processing at an information receiver.

FIG. 8 shows an exemplary process signal flow as implemented in accordance with an embodiment of the disclosure for retrieval transaction processing at an information receiver. In this embodiment, information is exchanged between a mobile device 802 and fixed information senders '@x' 832 and '@y' 834 within a request/response transaction that is initiated by mobile device 802. As shown in FIG. 8, the mobile device 802 comprises a plurality of wireless communication interfaces '@1' 804, '@2' 806, and '@3' 808, which are used by the mobile device 802 to communicate with fixed information senders '@x' 832 and '@y' 834. In this and other embodiments, each request/response transaction is self-contained and idempotent and comprises a plurality of requests and responses conducted over a period of time 810. There is no concept of a "session" or a "connection," therefore there are no set-up or tear-down handshakes.

As shown in FIG. 8, the mobile device 802 is a consumer of information (the "information receiver") and the fixed information senders '@x' 832 and '@y' 834, such as a Remote Fixed Node (RFN), are providers of information (the "information senders"). As likewise shown in FIG. 8, the mobile device 802 uses communications interface '@2' 806 to respectively send information retrieval requests 812 and 822 to the fixed information sender '@x' 832, which in turn responds with information retrieval responses 816 and 826, which contain the requested information. Likewise, mobile device 802 uses communications interface '@1' 804 to send an information retrieval request 814 to the fixed information sender '@y' 834, which in turn responds with an information retrieval response 818, which contains the requested information. The mobile device 802 likewise uses communications interface '@3' 808 to send an information retrieval request 820 to the fixed information sender '@x' 832, which in turn responds with an information retrieval response 824, which contains the requested information. In one embodiment, information retrieval requests 812 to the fixed information sender '@x' 832 and 814 to the fixed information sender '@y' 834 are distributed 842 over available links enabled by communication interfaces '@1' 804 and '@2' 806. In another embodiment, information retrieval requests 820 and 822 to the fixed information sender '@x' 832 are aggregated 844 over available links enabled by communication interfaces '@2' 806 and '@3' 808.

From the foregoing, it will be apparent to those of skill in the art that there is no correlation between transactions from the perspective of either information sender '@x' 832 or '@y' 834 as the mobile device 802, acting as a information receiver, is free to request information in any order and over any radio link interface ('@1' 804, '@2' 806, or '@3' 808) that it deems appropriate. Accordingly, the mobile device 802 chooses the interface ('@1' 804, '@2' 806, or '@3' 808) over which to conduct an information retrieval transaction based on the requirements of its associated applications and on the characteristics or operational state of its available radio links. For example, the mobile device 802 may choose different communications interfaces '@1' 804, '@2' 806, or '@3' 808 to:

minimize transaction delay by using an interface with a radio link connection that is in an active transfer state retrieve a large file by using a radio link with high throughput stream a video file by using a radio link with a high signal to interference-plus-noise ratio (SINR) to minimize probability of error increase throughput by using multiple radio links in parallel in order to aggregate bandwidth From the foregoing, skilled practitioners of the art will recognize the described information receiver-driven approach to the retrieval of information allows the mobile device 802 to manage transactions in order to optimize the exchange of information based on current conditions as observed by the mobile device 802.

Figure 9:
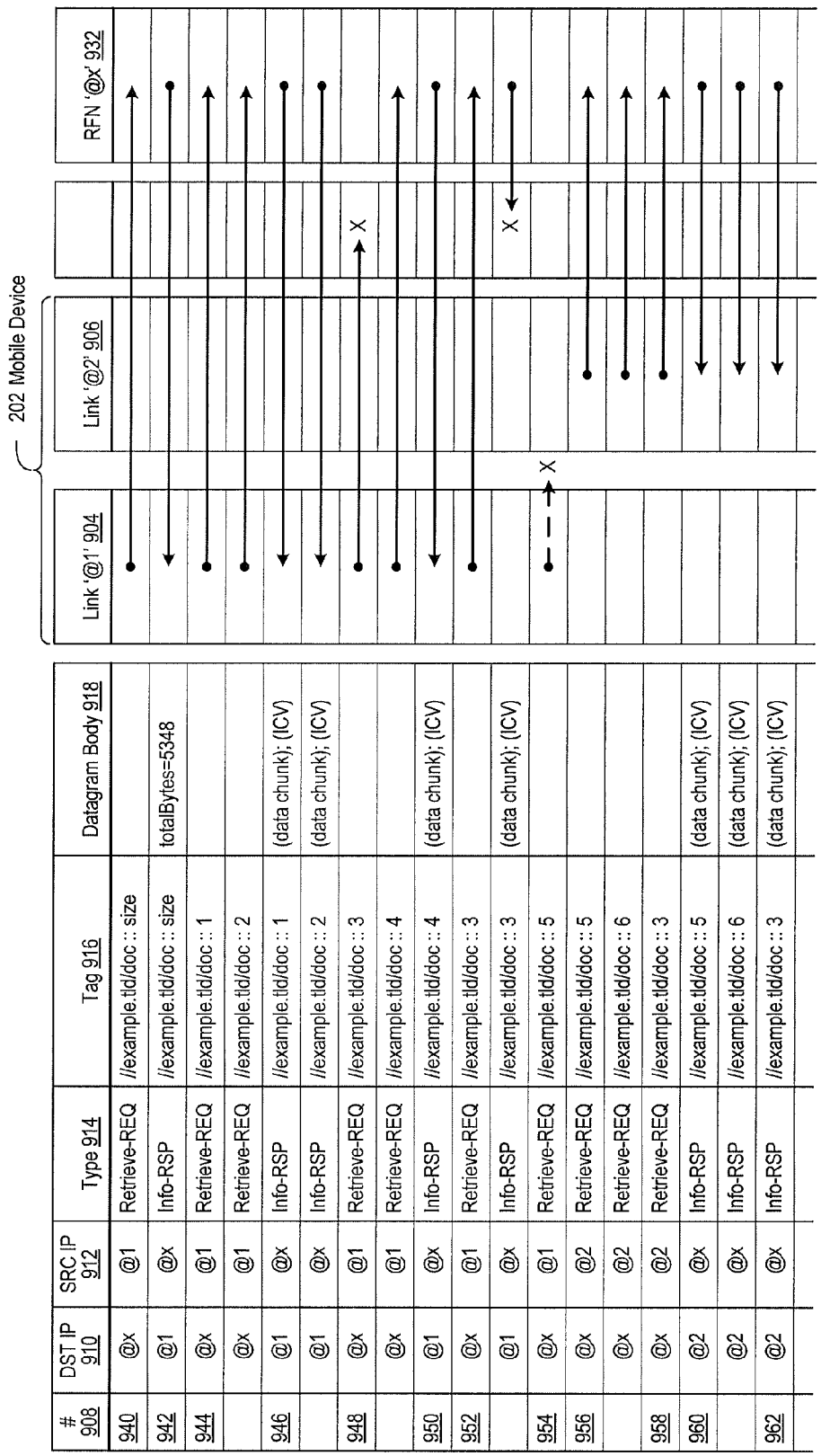
FIG. 9 shows a process signal flow for information retrieval for downlink transfer to a mobile device.

FIG. 9 shows an exemplary process signal flow for information retrieval as implemented in accordance with an embodiment of the disclosure for downlink transfer to a mobile device. In various embodiments, an information tag is part of an information request and response that is used to identify the information chunk being exchanged. In these and other embodiments, the information tag includes an information object identifier that is a reference to either the information itself or to an information container. The information tag may also include other metadata that is helpful in the exchange of information. In these various embodiments, the information object identifier is a label that is agreed to by both the information provider and the information consumer applications.

As used herein, a qualified information object identifier refers to a definitive pointer to a source of the information. If the information is stored in multiple repositories, a qualified information object identifier will refer to the copy stored at one of those repositories. For compatibility with current practices within the Internet-at-large, an exemplary qualified information object identifier may be based on the absolute URL: //RepositoryName/ObjectClass/ObjectName where RepositoryName is the fully-qualified domain name of an information repository (e.g., example.com)

ObjectClass is, optionally, the type of information object (e.g., documents/public).

ObjectName is a name associated with the information or its container (e.g., aFile.type)

In this example, the qualified information object identifier would be:

//example.com/documents/public/aFile.type

In various embodiments, if an information object is too large to be transported inside of a single datagram it will be segmented into a series of information chunks such that each information chunk can be transported within a single datagram. In these and other embodiments, an exemplary identity of the information chunk carried inside an information datagram may use the metadata designation mechanism:

//RepositoryName/ObjectClass/ObjectName::ChunkID

In these various embodiments, absolute information chunk identifiers may be used, which would result in an exemplary information tag of the form:

//RepositoryName/ObjectClass/ObjectName::(byteNumber, numberOfBytes)

However, for simplicity in these examples, a sequential <chunkNumber> in the range <1 . . . n> may be used to indentify the information chunks. As an example, the first information chunk of an information object would be:

//example.com/documents/public/aFile.type::1

Referring now to FIG. 9, a mobile device 202, comprising interface links '@1' 904 and '@2' 906 uses a request/response transaction described in greater detail herein to retrieve information from a Remote Fixed Node (RFN) '@x' 932. As shown in FIG. 9, the mobile device 202 is initially connected through the network infrastructure to RFN '@x' 932 via interface link '@1' 904. As likewise shown in FIG. 9, each step of the aforementioned request/response transaction comprises a step number 908, a destination IP address 910, a source IP address 912, a request/response type 914, a tag 916, and a datagram body 918.

In step 940, the mobile device 202, acting as an information receiver, determines the size of a desired information object <doc> by sending an information retrieval request for the metadata <size> to the RFN '@x' 932, which hosts the repository <example.tld>. In step 942, the RFN '@x' 932, acting as an information sender, sends an information retrieval response containing the requested <size>, in bytes, to the source of the information retrieval request, link interface '@1' 904. In step 944, the mobile device 202 sends via link interface '@1' 904 one or more information retrieval requests to the RFN '@x' 932 for the first group of information chunks. In various embodiments, the number of information retrieval requests that are concurrently issued by the mobile device 202 is governed by the rate control algorithm used by the mobile device 202.

In step 946, the RFN '@x' 932 processes the information retrieval requests in the order they are received and sends an information retrieval response corresponding to each of the requested information chunks to the source of the information retrieval request, link interface '@1' 904. Each information retrieval response includes the information data chunk and an integrity check value (ICV) that is computed by the RFN '@x' 932 and verified by the mobile device 202. In various embodiments, the ICV is computed using either a one-way hash or a pairwise key. In step 948, the mobile device 202 sends via link interface '@1' 904 one or more information retrieval requests to the RFN '@x' 932 for the next group of information chunks. In various embodiments, the number of information retrieval requests that may be issued concurrently by the mobile device 202 will be governed by the rate control algorithm used by the mobile device 202. In this embodiment, the information retrieval request for information chunk '3' is lost in transit between the radio access network (RAN) and the RFN '@x' 932 due to transmission error, router congestion, router mis-direction, etc.

In step 950, the RFN '@x' 932 processes the information retrieval request that it did receive and sends an information retrieval response corresponding to the requested information chunk to the source of the information retrieval request, link interface '@1' 904. In step 952, a timer associated with the lost retrieval request expires at some point in time and the mobile device 202 determines that information chunk '3' has been lost. Therefore the mobile device 202 initiates a new transaction via link interface '@1' 904 to request the missing chunk of information from the RFN '@x' 932. In this embodiment, the request for information chunk '3' is received by the RFN '@x' 932 but the information retrieval response is lost in transit between the RAN and the RFN due to transmission error, router congestion, router mis-direction, etc.

In step 954, the mobile device 202 sends an information retrieval request via link interface '@1' 904 to the RFN '@x' 932 for the next information chunk. Due to poor conditions on radio link interface '@1' 904, the mobile device 202 is notified by the PHY/MAC protocol layer associated with its radio link interface '@1' 904 that the request for information chunk '5' has been lost due to an uplink transmission error. In step 956, the mobile device 202 determines that the radio link via interface '@2' 906 is available and reissues the retrieval request for information chunk '5' over link interface '@2' 906 along with an information retrieval request for the next group of information chunks. In step 958, the mobile device 202 determines at some point in time that information chunk '3' has been lost and initiates a new transaction, sent this time via link interface '@2' 906, to request the missing chunk of information from the RFN '@x' 932.

In step 960, the RFN '@x' 932 processes the information retrieval requests in the order that they are received and sends an information retrieval response corresponding to each of the requested information chunks to link interface '@2' 906, which is the new source of the information retrieval requests. In step 962, the mobile device 202 receives the last of the requested information chunks and determines that all of the bytes of the information object have been received and issues no further information retrieval requests. Those skilled in the art will recognize that the procedures associated with the exemplary process signal flow of FIG. 9 may also be used to implement various device-driven handover strategies including make-before-break handover, break-before-make handover, and fast cell selection.

Figure 10:
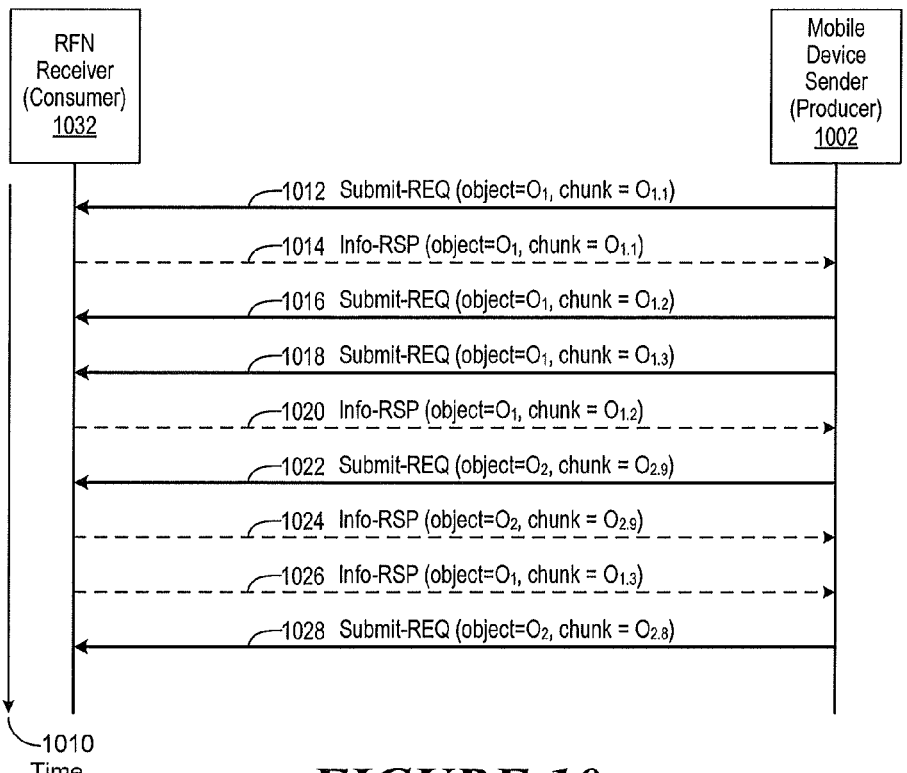
FIG. 10 shows a process signal flow for information sender-driven information submission.

FIG. 10 shows an exemplary process signal flow as implemented in accordance with an embodiment of the disclosure for information sender-driven information submission. In this embodiment, information is exchanged between a mobile device 1002 and a Remote Fixed Node (RFN) 1032 within a request/response transaction that is initiated by the mobile device 1002. In this and other embodiments, each request/response transaction is self-contained and idempotent and comprises a plurality of requests and responses conducted over a period of time 1010. There is no concept of a "session" or a "connection," therefore there are no set-up or tear-down handshakes.

Figure 11:
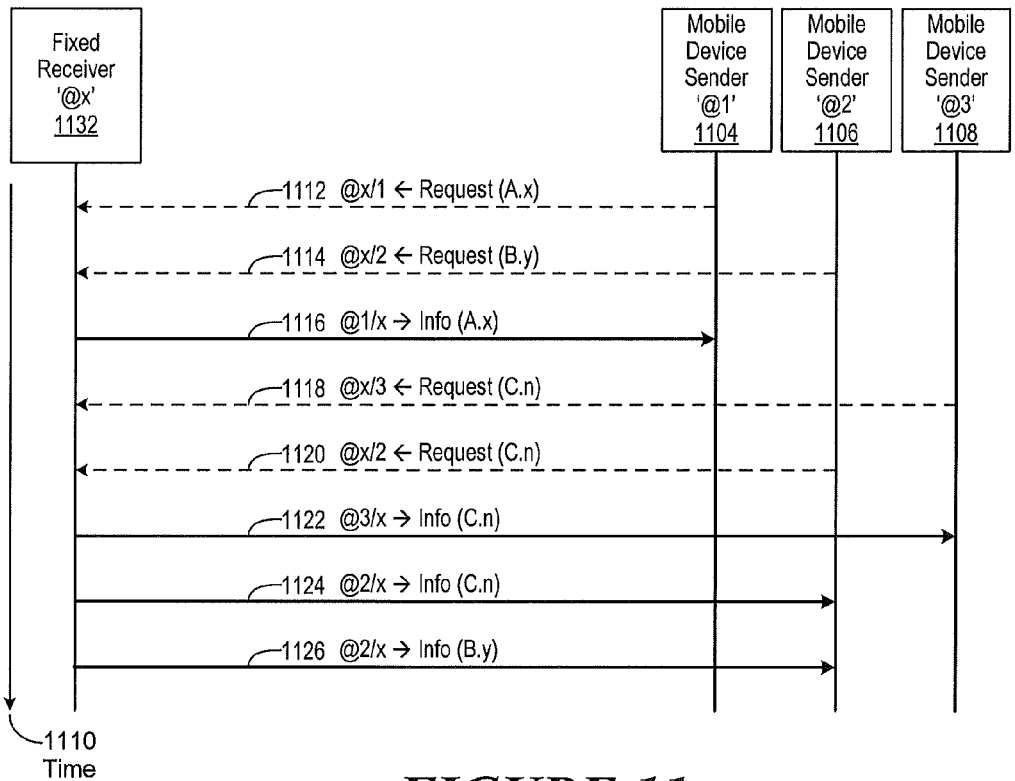
FIG. 11 shows a process signal flow for information submission transaction processing at an information receiver.

As shown in FIG. 10, a mobile device 1002 is a producer of information (the "information sender") and a Remote Fixed Node (RFN) 1032 is a consumer of information (the "receiver"). As likewise shown in FIG. 10, the mobile device 1002 sends information submission requests 1012, 1016, 1018, 1022, 1028 to the RFN 1032 to indicate the chunk(s) of information the mobile device 1002 is attempting to submit. The RFN 1032 replies with information submission responses 1014, 1020, 1024, 1026, thus completing the transaction. If the information sender (mobile device 1002) needs to submit additional chunks of information, then it initiates additional transactions. If the submitted information chunk is not received (e.g., due to transmission errors, network congestions, overload conditions on a server, equipment failure, etc.) by the RFN 1032, the mobile device 1002 likewise initiates a new transaction for the missing information FIG. 11 shows a process signal flow as implemented in accordance with an embodiment of the disclosure for information submission transaction processing at an information receiver. In this embodiment, information is exchanged between a plurality of mobile devices 1102, 1104, and 1106 and a fixed information sender '@x' 1132 within request/response transactions that are initiated by the plurality of mobile devices 1102, 1104, and 1106. In this and other embodiments, each request/response transaction is self-contained and idempotent and comprises a plurality of requests and responses conducted over a period of time 1110. There is no concept of a "session" or a "connection," therefore there are no set-up or tear-down handshakes.

As shown in FIG. 11, the plurality of mobile devices '@1' 1102, '@2' 1104, and '@3' 1106 are producers of information (the "information senders") and the fixed information receiver '@x' 1132, such as a Remote Fixed Node (RFN), is a consumer of information (the "information receiver"). As likewise shown in FIG. 11, the mobile device '@1' 1104 sends an information submission request 1112 to the fixed information receiver '@x' 1132, which in turn responds with an information submission response 1116. Likewise, mobile device '@2' 1106 respectively sends information submission requests 1114 and 1120 to the fixed information receiver '@x' 1132, which in turn responds with a information submission responses 1126 and 1120. Mobile device '@3' 1108 likewise sends an information submission request 1118 to the fixed information receiver '@x' 1132, which in turn responds with an information submission response 1122.

From the perspective of a Remote Fixed Node (RFN) acting as the fixed information receiver '@x' 1132, there is no correlation between the transactions. This allows the fixed information receiver '@x' 1132 to handle all transactions in a uniform manner, regardless of whether multiple submissions originate from the same information sender, or whether submissions from different information senders are interleaved. More importantly, it eliminates the need for maintaining state and context information at the fixed information receiver '@x' 1132.

Likewise, the fixed information receiver '@x' 1132 is free to make local decisions to optimize its operation. For example, the fixed information receiver '@x' 1132 is not required to respond to the information submission requests 1112, 1114, 1118, 1120 in the same order they were received. This allows the fixed information receiver '@x' 1132 to independently prioritize its handling of information submission requests according to local conditions.

As shown in FIG. 11, the mobile device '@2' 1106 issues two overlapping information submission requests to the fixed information receiver '@x' 1132, one submission request 1114 for information chunk 'B.y' and another submission request 1120 for information chunk 'C.n.' The mobile device '@3' 1108 likewise makes a concurrent information submission request 1118 for information chunk 'C.n.' In response, the fixed information receiver '@x' 1132 performs a local optimization by respectively sending information submission responses 1122, 1124 for information chunk 'C.n' to both mobile device '@3' 1108 and to mobile device '@2' 1104 before sending 1126 information submission response 'B.y' to mobile device '@2' 1106.

Figure 12:
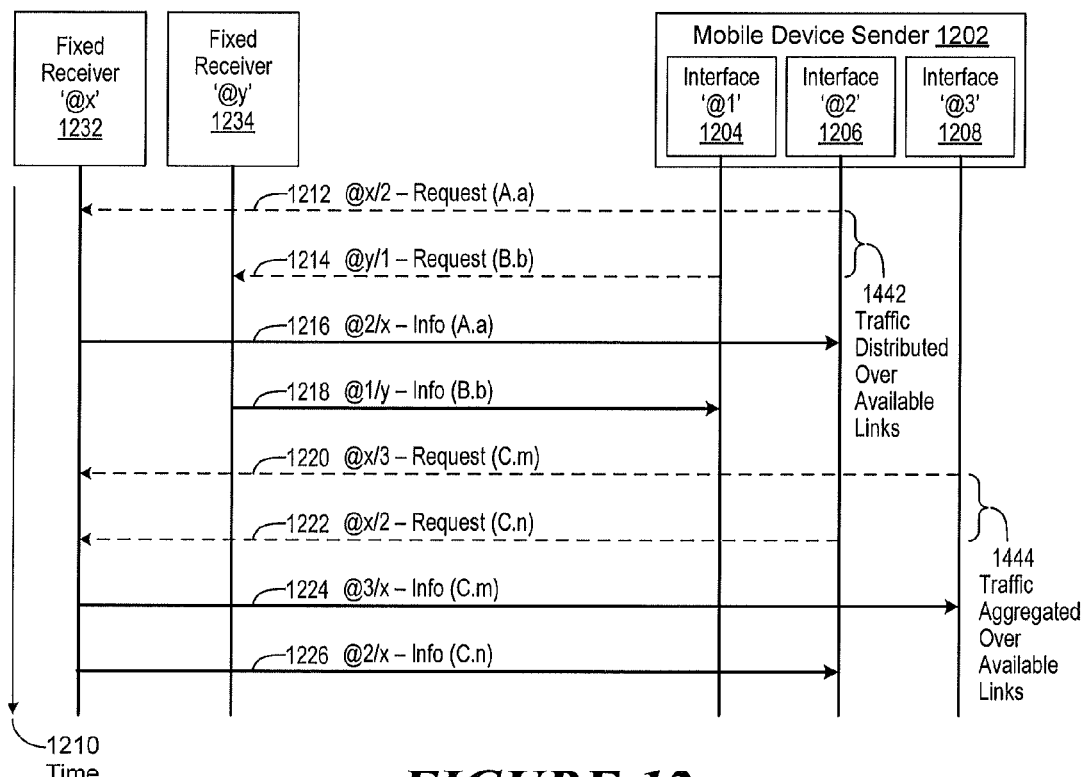
FIG. 12 shows a process signal flow for information submission transaction processing at an information sender.

FIG. 12 shows a process signal flow as implemented in accordance with an embodiment of the disclosure for submission transaction processing at an information sender. In this embodiment, information is exchanged between a mobile device 1202 and fixed information senders '@x' 1232 and '@y' 1234 within a request/response transaction that is initiated by a mobile device 1202. As shown in FIG. 12, the mobile device 1202 comprises a plurality of wireless communication interfaces '@1' 1204, '@2' 1206, and '@3' 1208 which are used by the mobile device 1202 to communicate with fixed information senders '@x' 1232 and '@y' 1234. In this and other embodiments, each request/response transaction is self-contained and idempotent and comprises a plurality of requests and responses conducted over a period of time 1210. There is no concept of a "session" or a "connection," therefore there are no set-up or tear-down handshakes.

As shown in FIG. 12, the mobile device 1202 is a producer of information (the "information sender") and the fixed information receivers '@x' 1232 and '@y' 1234, such as a Remote Fixed Node (RFN), are consumers of information (the "information receivers"). As likewise shown in FIG. 12, the mobile device 1202 uses communications interface '@2' 1206 to respectively send information submission requests 1212 and 1222 to the fixed information receiver '@x' 1232, which in turn responds with information submission responses 1216 and 1226. Likewise, mobile device 1202 uses communications interface '@1' 1204 to send an information submission request 1214 to the fixed information receiver '@y' 1234, which in turn responds with an information submission response 1218. The mobile device 1202 likewise uses communications interface '@3' 1208 to send an information submission request 1220 to the fixed information receiver '@x' 1232, which in turn responds with an information submission response 1224. In one embodiment, information submission requests 1212 and 1214 are distributed 1242 to fixed information receivers 1232 and 1234 over available links enabled by communication interfaces '@1' 1204 and '@2' 1206. In another embodiment, information submission requests 1220 and 1222 are aggregated 1244 to the same information receiver 1232 over available links enabled by communication interfaces '@2' 1206 and '@3' 1208.

From the foregoing, it will be apparent to those of skill in the art that there is no correlation between transactions from the perspective of either information receiver '@x' 1232 or '@y' 1234, as the mobile device 1202, acting as a information sender, is free to submit information in any order and over any radio link interface ('@1' 1204, '@2' 1206, or '@3' 1208) that it deems appropriate. Accordingly, the mobile device 1202 chooses the interface ('@1' 1204, '@2' 1206, or '@3' 1208) over which to conduct an information submission transaction based on the requirements of its associated applications and on the characteristics or operational state of its available radio links. For example, the mobile device 1202 may choose different communications interfaces '@1' 1204, '@2' 1206, or '@3' 1208 to:

minimize transaction delay by using an interface with a radio link connection that is in an active transfer state submit a large file by using a radio link with high throughput stream a video file by using a radio link with a high signal to interference-plus-noise ratio (SINR) to minimize probability of error increase throughput by using multiple radio links in parallel in order to aggregate bandwidth From the foregoing, skilled practitioners of the art will recognized the described information receiver-driven approach to the submission of information allows the mobile device 1202 to manage transactions in order to optimize the exchange of information based on current conditions as observed by the mobile device 1202.

Figure 13:
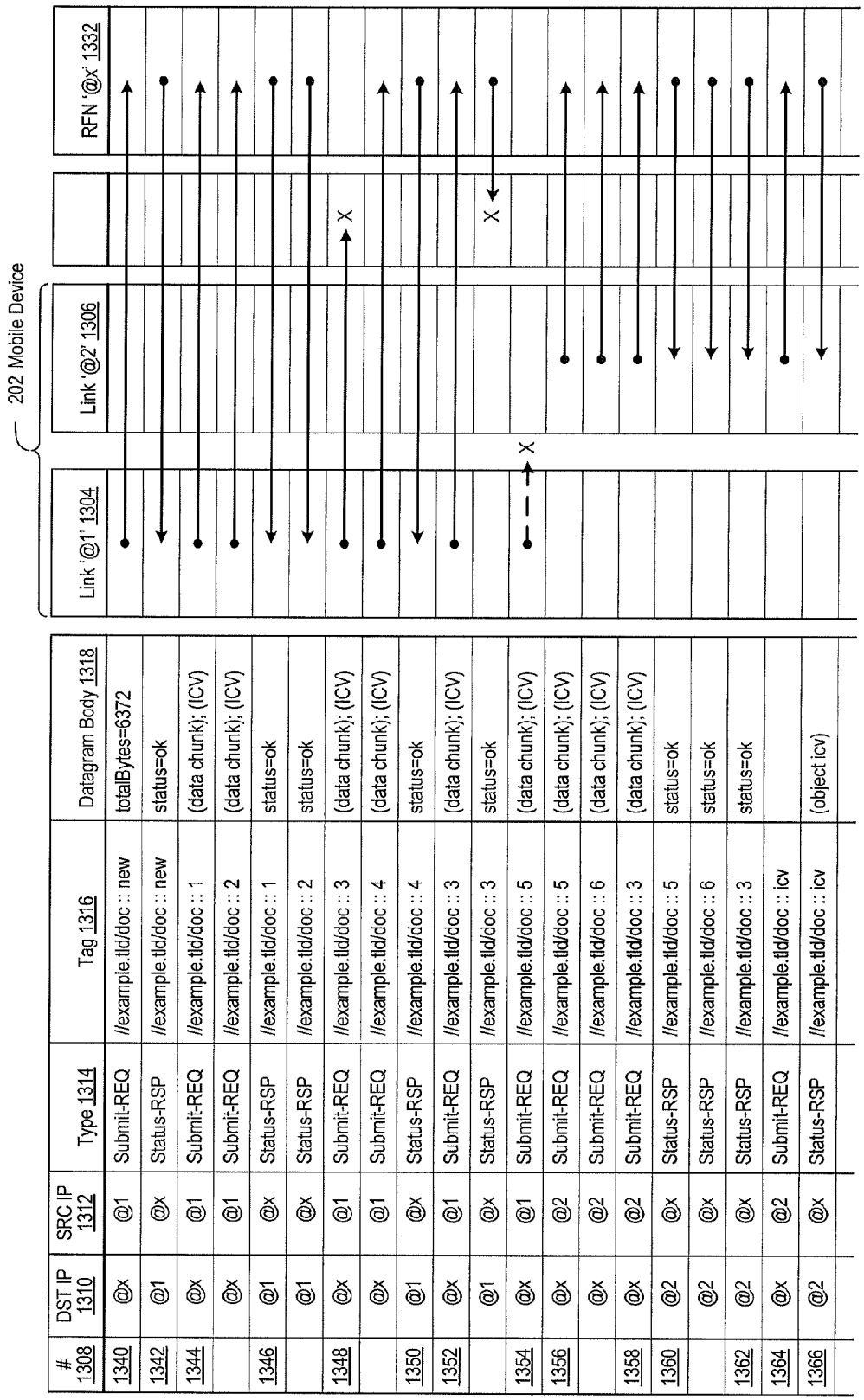
FIG. 13 shows a process signal flow for information submission for uplink transfer from a mobile device.

FIG. 13 shows an exemplary process signal flow for information submission as implemented in accordance with an embodiment of the disclosure for uplink transfer from a mobile device. Referring now to FIG. 13, a mobile device 202, comprising interface links '@1' 1304 and '@2' 1306 uses a request/response transaction described in greater detail herein to submit information to a Remote Fixed Node (RFN) '@x' 1332. As shown in FIG. 13, the mobile device 202 is initially connected through the network infrastructure to RFN '@x' 1332 via interface link '@1' 1304. As likewise shown in FIG. 13, each step of the aforementioned request/response transaction comprises a step number 1308, a destination IP address 1310, a source IP address 1312, a request/response type 1314, a tag 1316, and a datagram body 1318.

In step 1340, the mobile device 202, acting as an information sender, attempts to create a new information object <doc> at the RFN '@x' 1332, which hosts the repository <example.tld>. Included in the body of the information submission request is the expected size of the new information object, in bytes. In step 1342, the RFN '@x' 1332, acting as an information receiver, sends a status response containing the status of the information submission request to the source of the information submission request, link interface '@1' 1304. In this embodiment, resources for the requested information have been successfully allocated by the RFN '@x' 1332, as indicated by <status=ok>. In step 1344, the mobile device 202 sends one or more information submission requests via link interface '@1' 1304 to the RFN '@x' 1332 for the first group of information chunks. Each information submission request includes the information data chunk and an integrity check value (ICV) that is computed by the mobile 202 device and must be verified by the RFN '@x' 1332. In various embodiments, the ICV is computed using a one-way hash or a pairwise key. In these various embodiments, the number of information submission requests that may be issued concurrently by the mobile device 202 is governed by the rate control algorithm used by the mobile device 202.

In step 1346, the RFN '@x' 1332 processes the information submission requests in the order they are received and sends a status response corresponding to each of the submitted information chunks to the source of the information submission request, link interface '@1' 1304. A status response of <ok> indicates that the ICV computed by the RFN '@x' 1332 matched that provided by the mobile device 202 and the information chunk was successfully stored in the repository by the RFN '@x' 1332. In step 1348, the mobile device 202 sends one or more information submission requests to the RFN '@x' 1332 via link interface '@1' 1304 for the next group of information chunks. In various embodiments, the number of information submission requests that may be issued concurrently by the mobile device 202 is governed by the rate control algorithm used by the mobile device 202. In this embodiment, the information submission request for information chunk '3' is lost in transit between the RAN and the RFN due to transmission error, router congestion, router mis-direction, etc.

In step 1350, the RFN '@x' 1332 processes the information submission request that it did receive and sends a status response corresponding to the submitted information chunk to source of the information submission request, link interface '@1' 1304. In step 1352, a timer associated with the lost information submission request expires at some point in time and the mobile device 1332 determines that information chunk '3' has been lost. Therefore, the mobile device 202 initiates a new transaction via link interface '@1' to submit the missing chunk of information to the RFN '@x' 1332. In this embodiment, the submission for information chunk '3' is received by the RFN '@x' 1332, but the status response is lost in transit between the RAN and the RFN due to transmission error, router congestion, router mis-direction, etc. In step 1354, the mobile device 202 sends an information submission request to the RFN '@x' 1332 via link interface '@1' 1304 for the next information chunk. Due to the poor conditions on radio link '@1' 1304, the mobile device 202 is notified by the PHY/MAC protocol layer associated with its radio link interface '@1' 1304 that the submission for information chunk '5' has been lost due to an uplink transmission error.

In step 1356, the mobile device 202 determines that the radio link via interface '@2' 1306 is available and reissues the information submission request for information chunk '5' over link interface '@2' 1306 along with an information submission request for the next group of information chunks. In step 1358, the mobile device 202 determines at some point in time that information chunk '3' has been lost and initiates a new transaction, sent this time via link interface '@2' 1306, to submit the missing chunk of information from the RFN @x 1332.

In step 1360, the RFN '@x' 1332 processes the information submission requests in the order that they are received and sends a status response corresponding to each of the submitted information chunks to the link interface '@2' 1306, the new source of the submissions. Those of skill in the art will recognize that the duplicated submissions for information chunk '3' are processed without error by the RFN '@x' 1332 due to the idempotent nature of the transactions. In step 1362, the mobile device 202 receives a successful status response for the last of the submitted information chunks and determines that all of the bytes of the information object have been transmitted to the RFN '@x' 1332 and issues no further information submission requests.

In step 1364, the mobile device 202 verifies the overall integrity of the transferred information object <doc> by sending an information retrieval request for the metadata <icv> to the RFN '@x' 1332. In step 1365, the RFN '@x' 1332 computes the integrity check value of the stored <doc> object and sends an information retrieval response containing the request <icv> to the source of the request, link interface '@2' 1306. The mobile device 202 then verifies that the ICV received from the RFN '@x' 1332 matches the value computed by the mobile device 202, thus concluding the exchange. Those skilled in the art will recognize that the procedures associated with the exemplary process signal flow of FIG. 13 may also be used to implement various device-driven handover strategies including make-before-break handover, break-before-make handover, and fast cell selection.

Although the described exemplary embodiments disclosed herein are described with reference to exchanging data in a heterogeneous wireless communications environment the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A system for exchanging data in a heterogeneous wireless communications environment, comprising:
a wired network configured to exchange data;
a plurality of fixed nodes (FNs) connected to the wired network, each FN configured for using the wired network to exchange data;
a plurality of radio access networks (RANs) comprising a radio access technology (RAT), each of the RANs connected to the wired network; and
a plurality of mobile devices comprising a plurality of network connectivity interfaces for using one of the RATs to initiate a communication session with one of the RANs, the plurality of mobile devices using the wired network in a plurality of data exchange transactions to exchange a set of datagrams comprising at least a destination network address, a source network address, and a chunk of data, wherein a data exchange transaction comprises:
a datagram comprising a transaction request sent from a first mobile device to a remote node (RN), the transaction request being a data retrieval request or data submission request; and
a datagram comprising a transaction response received by the first mobile device from the RN, the transaction response being a data retrieval response or a data submission response.

2. The system of claim 1, wherein a mobile device comprises at least a first network connectivity interface operable to use a first RAT to initiate a communication session with a first RAN, wherein:
the mobile device uses a first network address assigned by the first RAN to the first network connectivity interface as the source network address to initiate a first set of data exchange transactions;
the mobile device comprises at least a second network connectivity interface operable use a second RAT to initiate a communication session with a second RAN;
the mobile device uses a second network address assigned by the second RAN to the second network connectivity interface as the source network address to initiate a second set of data exchange transactions.

3. The system of claim 2, wherein:
a first IP address is used in the first set of data exchange transactions over the first network connectivity interface to exchange a first set of data between the mobile device and a first RN; and
a second IP address is used in the set of data exchange transactions over the second network connectivity interface to exchange a second set of data between the mobile device and a second RN.

4. The system of claim 3, wherein:
the second IP address is used in another set of data exchange transactions over the second network connectivity interface to exchange another set of data between the mobile device and the first RN.

5. The system of claim 3, wherein:
a set of data comprises a sequence of data chunks in which a first data chunk precedes a second data chunk in the sequence, and
the mobile device initiates a data transaction request for the second data chunk before initiating a data transaction request for the first data chunk.

6. The system of claim 3, wherein:
a set of data comprises a sequence of data chunks in which a first data chunk precedes a second data chunk in the sequence, and
the first or second RN initiates a data transaction response for the second data chunk before initiating a data transaction response for the first data chunk.

7. The system of claim 3, wherein:
a set of data comprises a sequence of data chunks in which a first data chunk precedes a second data chunk in the sequence,
the mobile device receives the second data chunk before the mobile device receives the first data chunk; and
the mobile devices processes the first data chunk and the second data chunk in sequential order to generate the set of data.

8. The system of claim 3, wherein:
a first transaction request from the first set of data exchange transactions is initiated contemporaneously with a second transaction request from the first set of data exchange transactions;
a first transaction request from the second set of data exchange transactions is initiated contemporaneously with a second transaction request from the second set of data exchange transactions; and
a first transaction request from the first set of data exchange transactions is initiated contemporaneously with a second transaction request from the second set of data exchange transactions.

9. The system of claim 3, wherein the mobile device conducts a make-before-break handover to initiate the communication session with the second RAN, wherein the first transaction in the second set of data exchange transactions between the mobile device and the second RN is initiated by the mobile device temporally before the communication session with the first RAN is terminated.

10. The system of claim 3, wherein the mobile device conducts a break-before-make handover to initiate the communication session with the second RAN, wherein the first transaction in the second set of data exchange transactions between the mobile device and the second RN is initiated by the mobile device temporally after completion of all transactions in the first set of data exchange transactions between the mobile device and the first RN.

11. The system of claim 1, wherein a datagram in the set of datagrams comprises at least one of:
an Internet Protocol (IP) packet;
an Ethernet frame; and
an MPLS packet.

12. The system of claim 1, wherein the remote node comprises at least one of:
a fixed node; and
a second mobile device.

13. A method for exchanging data in a heterogeneous wireless communications environment via a mobile device, comprising:
transmitting a request from the mobile device for a data set comprising a sequence of data chunks in which a first data chunk precedes a second data chunk in the sequence;
receiving the first data chunk from a first Radio Access Network (RAN) after receiving the second data chunk from a second RAN at the mobile device, the first data chunk being sent to a first IP address assigned to the mobile device by the first RAN, the second data chunk being sent to a second IP address assigned to the mobile device by the second RAN; and
processing the first and second data chunks received from the first and second RAN, respectively, via the mobile device in sequential order to generate the data set at the mobile device.

14. A method for exchanging data in a heterogeneous wireless communications environment via a mobile device, comprising:
- transmitting a request for a first data chunk of a data set from a mobile device to a first Radio Access Network (RAN);
- receiving the first data chunk of the data set from the first RAN at the mobile device, the first data chunk being sent to a first IP address assigned to the mobile device by the first RAN;
- transmitting a request for a second data chunk of the data set from the mobile device to a second RAN, the data set comprising a sequence of data chunks in which the first data chunk precedes the second data chunk in the sequence;
- receiving the second data chunk of the data set from the second RAN at the mobile device, the second data chunk being sent to a second IP address assigned to the mobile device by the second RAN; and
- generating the data set at the mobile device using the first and second data chunks, wherein the mobile device initiates a data transaction request for the second data chunk before initiating a data transaction request for the first data chunk.

* * * * *

UNITED STATES PATENT AND TRADEMARK OFFICE
CERTIFICATE OF CORRECTION

| | | |
|---|---|---|
| PATENT NO. | : 9,025,531 B2 | Page 1 of 1 |
| APPLICATION NO. | : 13/813287 | |
| DATED | : May 5, 2015 | |
| INVENTOR(S) | : William Gage | |

It is certified that error appears in the above-identified patent and that said Letters Patent is hereby corrected as shown below:

Claims

Column 19, Claim 2, Line 37 replace "operable use" with --operable to use--

Column 19, Claim 3, Line 48 replace "the set" with --the second set--

Signed and Sealed this
Eighth Day of December, 2015

Michelle K. Lee
*Director of the United States Patent and Trademark Office*